United States Patent
Vellingiri et al.

(10) Patent No.: US 11,079,978 B2
(45) Date of Patent: Aug. 3, 2021

(54) PRINT IN A USER DEFINED PRINT AREA OF A PRINT MEDIA

(71) Applicant: Hewlett-Packard Development Company, L.P., Spring, TX (US)

(72) Inventors: Devi Vellingiri, Bangalore (IN); Binod Kumar, Bangalore (IN); Raghavendra T, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,423

(22) PCT Filed: Feb. 28, 2018

(86) PCT No.: PCT/US2018/020236
§ 371 (c)(1),
(2) Date: Oct. 25, 2019

(87) PCT Pub. No.: WO2018/200073
PCT Pub. Date: Nov. 1, 2018

(65) Prior Publication Data
US 2020/0057587 A1 Feb. 20, 2020

(30) Foreign Application Priority Data
Apr. 27, 2017 (IN) .............................. 201741015029

(51) Int. Cl.
*G06F 3/12* (2006.01)
*H04L 12/28* (2006.01)

(52) U.S. Cl.
CPC .......... G06F 3/1208 (2013.01); G06F 3/1252 (2013.01); G06F 3/1256 (2013.01); *H04L 12/28* (2013.01)

(58) Field of Classification Search
CPC .... G06F 3/1208; G06F 3/1252; G06F 3/1256; G06F 3/1204; G06F 3/1242;
(Continued)

(56) References Cited

U.S. PATENT DOCUMENTS 5,316,396 A * 5/1994 Fukaya .................. G06K 15/00
358/1.17
8,289,593 B2 10/2012 Sugahara et al.
(Continued)

FOREIGN PATENT DOCUMENTS

JP         5753410      9/2011
WO    WO-2012134914    10/2012

*Primary Examiner* — Iriana Cruz
(74) *Attorney, Agent, or Firm* — HP Inc. Patent Department

(57) ABSTRACT

The subject matter discloses examples of a print interface manager. The print interface manager comprises a print area selection engine to receive a user instruction for printing print data on 5 a user defined print area of a print media. In response to the user instruction for printing print data, the print interface manager obtains a print area input defining the print area, wherein the print area input indicates a matrix block corresponding to user defined print area of the print media. The print 10 interface manager further provides the print area input to a print unit to print the print data in the user defined print area of the print media.

15 Claims, 7 Drawing Sheets

(58) Field of Classification Search
CPC .... G06F 3/1285; G06F 3/1205; G06F 3/1257; H04L 12/28; G06K 15/005; G06K 15/1885; G06K 15/02; H04N 1/00456; H04N 1/00461; H04N 1/00453; H04N 1/00442

See application file for complete search history.

(56) References Cited

U.S. PATENT DOCUMENTS

| | | |
|---|---|---|
| 8,351,101 B2 | 1/2013 | Han et al. |
| 2005/0068549 A1* | 3/2005 | Jaeger ................ G06K 15/005 358/1.2 |
| 2005/0088694 A1 | 4/2005 | Ogiwara |
| 2010/0165386 A1* | 7/2010 | Kusunoki .......... H04N 1/00456 358/1.15 |
| 2016/0054885 A1 | 2/2016 | Cai |
| 2017/0140255 A1* | 5/2017 | Norasak .................... B41J 3/36 |

* cited by examiner

PRINT IN A USER DEFINED PRINT AREA OF A PRINT MEDIA

BACKGROUND

Print devices are peripherals commonly used in home and office environments for obtaining printed copies of digital documents having print data, such as text or image. The digital documents are printed on a print media. The print device may print the entire digital document on the entire print media such that the print data is printed with the same alignment as is visible in the digital document. For instance, an image positioned on a center of a digital document will be printed on the center of the print media.

BRIEF DESCRIPTION OF DRAWINGS

The detailed description is described with reference to the accompanying figures. It should be noted that the description and figures are merely example of the present subject matter and are not meant to represent the subject matter itself.

Figure 1:
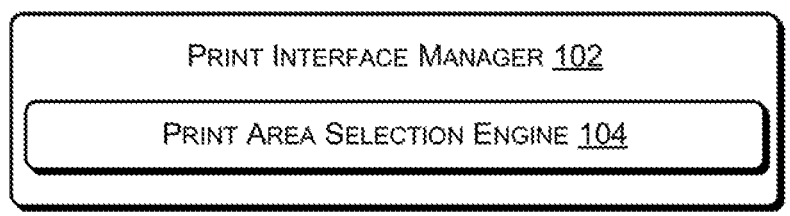
FIG. 1 illustrates a print interface manager, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Print devices are commonly used for obtaining printed copies of digital documents. The digital documents are printed on a print media to obtain the printed copies of digital documents. To enable a user to use the print device, a print interface may be provided either in the form of a graphical user interface on the print device or as a web interface on a user device of the user. The print interface may allow a user to customize print settings, for example, color type preference, print resolution, page size, and orientations for the digital document for each print job. The user may thus obtain customized printed copies of the digital documents by defining the print settings and/or selecting the print media type and size to be used for the print job.

In such a case, the print device may print the digital document on the entire print media such that the print data is printed in the same position as is visible in the digital document. For instance, an image positioned on a center of a digital document will be printed on the center of the print media. To customize the appearance or placement of the print data over the print media, the user may have to open and edit the digital document in an application program. The user may align and position the print data in the same area of the digital document as the user desires the print data to appear on the printed copy. For instance, for printing the print data at a specific blank space on a partially printed print media, the user may have to edit the digital document to place the print data in areas corresponding to the blank space on the partially printed print media. The user may thus spend extra time and resources to edit the document. Further, the user may have to try and align the print data and print the digital document more than once to get the desired placement on the print media, thereby resulting in wastage of print media and resources, such as ink of the print devices.

Example implementations for a print device and a print interface manager are described. In said implementations, the print interface manager allows a user to select and indicate the print area of the print media within which the print data is to be printed. In one example, the print area may be defined through a print matrix having a plurality of matrix blocks. The user may define a first print matrix and indicate a matrix block from the first print matrix as the user defined print area. Thereafter, the print device may print the print data in the user defined print area based on a print area input indicating the matrix block provided in a print command from the user. The present subject matter thus facilitates printing of the print data in a user selected area of a print media.

To print the print data, the user may initially access the print interface manager and provide instructions for printing the print data. On receiving the print instructions, the printer interface manager may provide the user, access to a print area selection interface. The user may then define a first print matrix using the print area selection interface for creating a logical partition of the print media into smaller matrix blocks. The user may subsequently provide an indication of a row number and a column number of the first print matrix for defining the matrix block corresponding to the user defined print area of the print media. The print interface module may subsequently obtain a print area input defining the print area such that the print area input indicates the matrix block corresponding to the user defined print area of the print media. The print interface module may then provide the print area input to a print unit of the print device. In one example, the print area input indicates the row number and the column number of the matrix block corresponding to the user defined print area and a total number of rows and columns used for defining the first print matrix.

On receiving a print command, the print unit may determine user space coordinates corresponding to the user defined print area. In one example, the print unit may determine the user space coordinates on ascertaining the print command to include the print area input. Further, the user space coordinates may be determined based on the print area input and dimensions of the print media. In one example, the user space coordinates indicate a starting point and dimensions for the user defined print area on the print media. Further, the print unit may convert the user space coordinates to device space coordinates indicating the starting point and dimensions for the user defined print area in a printer control language. The print data may subsequently be printed in the user defined print area of the print media.

The present subject matter thus facilitates a user to print a digital document or parts of a digital document on a user specified print area of a print media. Allowing the user to specify the print area helps in customizing the appearance or placement of the print data over the print media, thereby improving the user experience. Further, selecting the print area over the print interface, allows the user to obtain the customized print without manually editing a digital document having the print data, thereby reducing the user's time and effort in obtaining customized prints. Defining the print area over the print interface further helps in reducing wastage of print media and resources, such as ink of the print devices as compared to current techniques, as the user does not need to try and manually align the print data and print the print data more than once to get the desired placement on the print media.

The present subject matter is further described with reference to FIGS. 1 to 7. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a print interface manager 102 for printing print data in a user defined print area of a print media, according to an example implementation of the present subject matter. In one implementation, the manager 102, hereinafter referred to as manager 102, may be implemented on a user device, such as a desktop, a laptop, portable computers, and a tablet. In another example, the printer interface manager 102 may be implemented on a print device, such as a printer, a multifunction printer, a home printer, and an office printer.

In one implementation, the manager 102 includes a print area selection engine 104, hereinafter referred to as the selection engine 104, to receive a user instruction for printing the print data on a user defined print area of a print media. On receiving the print instructions, the selection engine 104 may obtain a print area input defining the print area. In one example, the print area input indicates a matrix block corresponding to user defined print area of the print media. The selection engine 104 may further provide the print area input to a print unit (not shown in the figure) to print the print data in the user defined print area of the print media.

Figure 2:
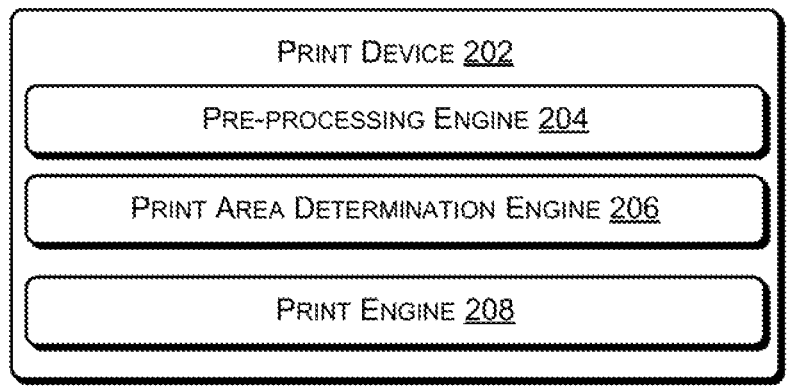
FIG. 2 illustrates a print device, according to an example implementation of the present subject matter.

FIG. 2 illustrates a print device 202, according to an example implementation of the present subject matter. In one example, the print device 202 includes a pre-processing engine 204, a print area determination: engine 206, and a print engine 208. The pre-processing engine 204 initially determines if a print command includes user indication for printing print data on a user defined print area of a print media. In one example, the print command includes a print area input indicating the user defined print area of the print media.

On determining that the print command includes user indication for printing print data on a user defined print area, the print area determination engine 206, hereinafter referred to as the determination engine 206, determines user space coordinates corresponding to the user defined print area. In one example, the user space coordinates indicate a starting point and dimensions for the user defined print area on the print media. The print area determination engine 206 may determine the user space coordinates based on the print area input and dimensions of the print media. Subsequently, the print data is printed by the print engine 208 in the user defined print area of the print media using the user space coordinates.

Figure 3:
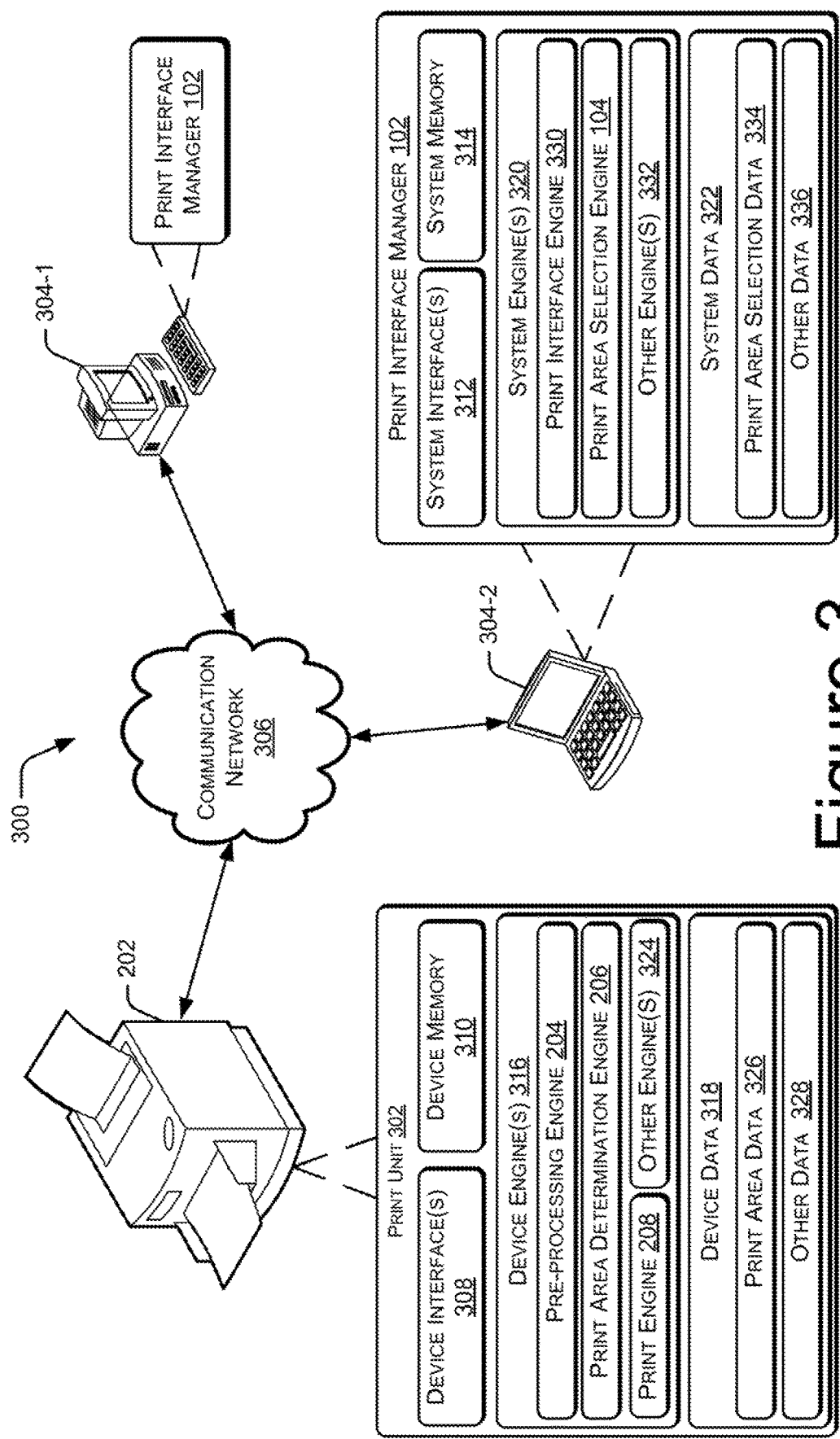
FIG. 3 illustrates a computing environment having a print interface manager and a print unit, according to an example implementation of the present subject matter.
Figure 4:
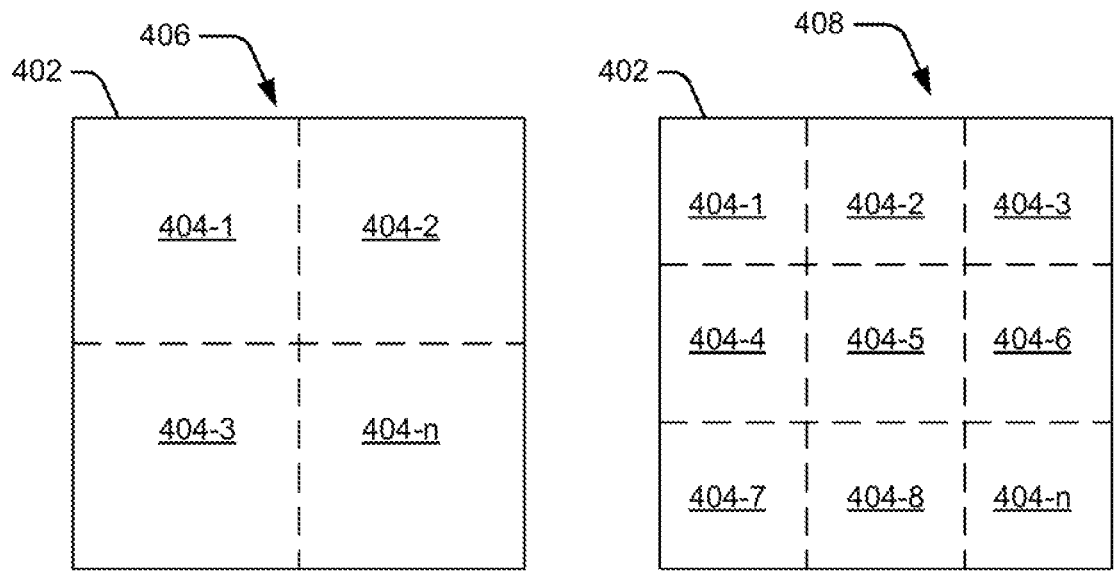
FIG. 4 illustrates exemplary print matrices used for logical partition of a print media, according to an example implementation of the present subject matter.
Figure 4:
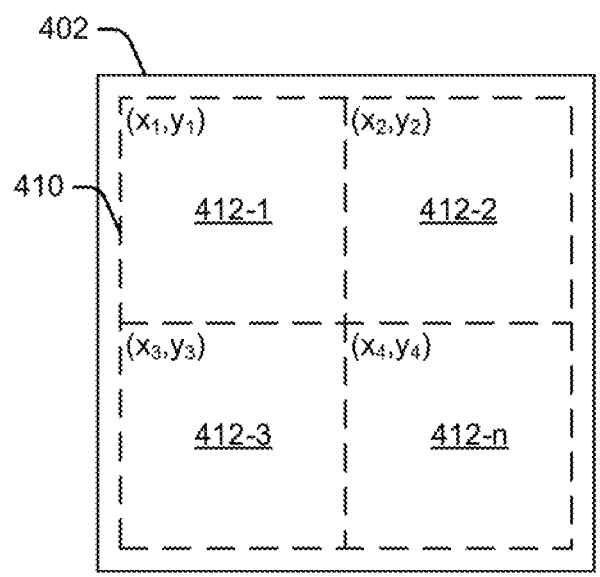

FIG. 3 illustrates a computing environment 300 having the manager 102 and a print unit 302, according to an example implementation of the present subject matter. The computing environment 300 includes user devices 304-1 and 304-2 communicatively coupled to the print device 202. In one example implementation, one of user devices such as 304-2 may be the manager 102. In another example implementation, engines of the manager 102 may be implemented on both, the user devices 304 and the print device 202, allowing the user to use either of the user device 304 or the print device 202 for providing print instructions. In yet another example implementation, engines of the manager 102 may be implemented on the print device 202, as illustrated in FIG. 4. Further, the print unit 302 is implemented on the print device 202.

An example of such a user device(s) 304 include, but are not limited to, desktop computers, laptops, tablets, portable computers, workstation, mainframe computer, servers, and network servers. The present approaches may also be implemented in other types of user device(s) 304 without deviating from the scope of the present subject matter. Examples of the print device 202 include, but are not limited to, a printer, a multifunction printer, a home printer, and an office printer.

Further, the user devices 304 and the print device 202 are connected with each other over a communication network 306, allowing the user to provide print instructions to the print device 202 using the user devices 304. The communication network 306 may be a wireless network, a wired network, or a combination thereof. The communication network 306 can also be an individual network or a collection of many such individual networks, interconnected with each other and functioning as a single large network, e.g., the Internet or an intranet. The communication network 306 can be one of the different types of networks, such as intranet, local area network (LAN), wide area network (WAN), and the internet. In an example, the communication network 306 may include any communication network that use any of the commonly used protocols, for example, Hypertext Transfer Protocol (HTTP), and Transmission Control Protocol/Internet Protocol (TCP/IP).

In one example implementation, the print unit 302 and the manager 102 include interface(s) and memory. For instance, the print unit 302 includes device interface(s) 308 and device memory 310. The manager 102 includes system interface(s) 312 and system memory 314. The device interface(s) 308 and the system interface(s) 312, hereinafter collectively referred to as interface(s) (308, 312), may include a variety of interfaces, for example, interfaces for data input and output devices, referred to as I/O devices, storage devices, network devices, and the like. The interface(s) (308, 312) facilitate communication between the print unit 302, the manager 102, and various other computing devices connected in a networked environment. The interface(s) (308, 312) may also provide a communication pathway for one or more components of the print unit 302 and the manager 102. Examples of such components include, but are not limited to, input device such as keyboards and computer mice. Further, in one example, interface(s) (308, 312) may reside on the print device 202 and the user device 304 implementing the print unit 302 and the manager 102, respectively.

The device memory 310 and the system memory 314, hereinafter collectively referred to as, memory (310, 314)

may store one or more computer-readable instructions, which may be fetched and executed to provide print interfaces to users for providing print instructions. The memory (310, 314) may include any non-transitory computer-readable medium including, for example, volatile memory such as RAM, or non-volatile memory such as EPROM, flash memory, and the like. The print unit 302 and the manager 102 further includes engine(s) and data. For instance, the print unit 302 includes engine(s) 316 and data 318. The manager 102 includes engine(s) 320 and data 322.

The engine(s) (316, 320) may be implemented as a combination of hardware and programming (for example, programmable instructions) to implement one or more functionalities of the engine(s) (316, 320). In examples described herein, such combinations of hardware and programming may be implemented in several different ways. For example, the programming for the engine(s) (316, 320) may be processor executable instructions stored on a non-transitory machine-readable storage medium and the hardware for the engine(s) (316, 320) may include a processing resource (for example, one or more processors), to execute such instructions. In the present examples, the machine-readable storage medium may store instructions that, when executed by the processing resource, implement engine(s) (316, 320). In such examples, the print unit 302 and the manager 102 may include the machine-readable storage medium storing the instructions and the processing resource to execute the instructions, or the machine-readable storage medium may be separate but accessible to the print unit 302 and the manager 102 and the processing resource. In other examples, engine(s) (316, 320) may be implemented by electronic circuitry.

The data (318, 322) includes data that is either stored or generated as a result of functionalities implemented by any of the engine(s) (316, 320). In an example, the engine(s) 316 of the print unit 302 include the pre-processing engine 204, the determination engine 206, the print engine 208, and other engine(s) 324. The other engine(s) 324 may implement functionalities that supplement applications or functions performed by the print unit 302 or engine(s) 316. Further, the data 318 may include print area data 326 and other data 328.

Further, the engine(s) 320 of the manager 102 include print interface engine 330, the selection engine 104, and other engine(s) 332. The other engine(s) 332 may implement functionalities that supplement applications or functions performed by the manager 102 or engine(s) 320. Further, the data 322 may include print area selection data 334 and other data 336.

As previously described, the manager 102 facilitates a user to select and indicate the print area, i.e., a part of the print media on which the print data is desired to be printed. In operation, the print interface engine 330 may initially provide a print interface to a user for receiving print instructions for printing print data. The user may access the print interface and provide instructions for printing the print data. In one example, the user may provide instructions for printing an entire digital document. The print data in such a case may be the digital document. In another example, the user may provide instructions for printing a part of the digital document. The print data in such a case may be user selected part of the digital document.

On receiving the print instructions, the print interface engine 330 may determine if the user has chosen an option for printing the print data on a user defined print area of the print media. The print interface engine 330 may then provide the user instruction for printing the print data on a user defined print area to the selection engine 104. On receiving the user instruction for printing the print data on a user defined print area of the print media, the selection engine 104 may obtain a print area input defining the print area.

The selection engine 104 may initially provide to the user, access to a print area selection interface for defining the print area. The selection engine 104 may request the user to define a first print matrix for creating a logical partition of the print media into smaller matrix blocks. In one example, the selection engine 104 may request the user to indicate a total number of rows and columns that the user desires to have in the first print matrix. To define the first print matrix, the user may provide a matrix input indicating number of rows and columns. On receiving the matrix input indicating the total number of rows and columns, the selection engine 104 may define the print matrix having the user defined number of columns and rows. Defining the print matrix allows logical partition of the print media in a plurality of user defined blocks, as illustrated in FIG. 4. As illustrated in FIG. 4, a print media 402 is divided into plurality of user defined blocks 404-1, 404-2, 404-3, . . . , 404-n. The plurality of user defined blocks 404-1, 404-2, 404-3, . . . , 404-n are hereinafter collectively referred to as plurality of user defined blocks 404.

In one example, if the user provides a matrix input of 2×2, indicating the total number of rows as two and the total number of columns as two, the selection engine 104 may define the print matrix having two rows and two columns as indicated in the FIG. 406. The selection engine 104 may thus divide the print matrix, and in turn the print media, into a plurality of user defined blocks 404-1, 404-2, 404-3, and 404-n. In said example, the print matrix, and in turn the print media, is divided into 4 matrix blocks.

In another example, if the user provides a matrix input of 3×3, indicating the total number of rows as three and the total number of columns as three, the selection engine 104 may define the print matrix having three rows and three columns as indicated in the FIG. 408. The selection engine 104 may thus divide the print matrix, an in turn the print media, into a plurality of user defined blocks 404-1, 404-2, 404-3, 404-4, 404-5, 404-6, 404-7, 404-8, and 404-n. In said example, the print matrix, and in turn the print media, is divided into 9 matrix blocks.

Upon defining the print matrix, the selection engine 104 may request the user to define the desired print area for printing the print data, by selecting the matrix block corresponding to the desired print area of the print media. In one example, the user may define the print area by indicating a row number and a column number of the print matrix corresponding to the matrix block. For instance, if the user desires to have the print data printed in a right bottom corner of the print media, the user may indicate the row number 2 and column number 2 to identify the matrix block (2, 2), i.e., the matrix block 404-n of the first print matrix as illustrated in FIG. 406. Although, the present subject matter has been described with the user defined print area equal to a single matrix block, the user may also define two adjacent, but non-diagonal, matrix blocks as the print area.

On receiving the indication of the row number and the column number of the print matrix for defining the matrix block, the selection engine 104 may generate the print area input indicating the matrix block corresponding to the user defined print area of the print media. In one example, the print area input may indicate the row number and the column number of the matrix block corresponding to user defined print area and a total number of rows and columns used for defining the first print matrix for logical partition of the print media. In one example, the print area input may be saved in the print area selection data 334 for further processing. Further, the selection engine 104 may provide the print area input to the print unit 302 to print the print data in the user defined print area of the print media. In one example, the selection engine 104 may automatically provide a print command to the print unit 302 to print the print data upon obtaining the print area input. In another example, the user may provide the print command, for instance, by selecting a print icon on the print interface.

On receiving the print command, the pre-processing engine 204 may allocate resources required for completing a print job of printing the print data. In one example, a job scheduler and job manager firmware of the print device 202 may allocate the resources. The pre-processing engine 204 may further determine if the print command includes user indication for printing print data on a user defined print area of a print media. On determining that the print command includes a print area input indicating the user defined print area of the print media, the pre-processing engine 204 may trigger the determination engine 206 to process the print command for printing the print data in the user defined print area. The pre-processing engine 204 may further save the print area input in the print area data 326.

The determination engine 206 may subsequently determine user space coordinates corresponding to the user defined print area, based on the print area input and dimensions of the print media. To determine the user space coordinates, the determination engine 206 may initially obtain dimensions of the print media. In one example, the determination engine 206 may determine if the user has selected any specific page size and type, such as A4 and A5 and accordingly determine the dimensions of the selected print media. In absence of any user selection, the determination engine 206 may determine the default print settings and accordingly determine the dimensions of the default print media.

Further, in one example, the dimensions of the print media may be logical dimensions, determined based on actual dimensions of the print media and non-printable margins of the print media. For instance, for a print media of A4 size the actual dimension may be 297 millimeter (mm)×420 mm, while the logical dimensions may be less, say, 270 mm×400 mm, considering non-printable margins of 27 mm and 20 mm. The non-printable margins may be user defined or set default by the print device 202. The logical dimensions may thus be lesser than the actual dimension, as illustrated in FIG. 4. As illustrated, the dotted lines 410 indicate the logical print media, on the print media 402, having the logical dimensions obtained based on the non-printable margins.

The determination engine 206 may further define a second print matrix using the dimensions of the print media and the total number of rows and columns as obtained from the print area input. The second print matrix has the same number of rows and columns the first print matrix. The second print matrix, thus, has a plurality of blocks equal to the plurality of user defined blocks of the first print matrix. The determination engine 206 may subsequently designate top margin coordinates to starting point of each of the plurality of blocks. As illustrated in FIG. 4, the top margin coordinates $(X_1, Y_1)$, $(X_2, Y_2)$, $(X_3, Y_3)$, and $(X_4, Y_4)$ indicate the starting position of each of the plurality of matrix blocks. In one example, the determination engine 206 may further define the top margin coordinates $(X_i, Y_j)$ in terms of Cartesian coordinates with the top margin $(X_1, Y_1)$ of the left top matrix block as the origin (0, 0).

The determination engine 206 may further determine dimension, i.e., length and width of each of the plurality of blocks based on the dimensions of the print media and the total number of rows and columns of the second print matrix. In one example, the determination engine 206 may divide length of the logical print media by the number of rows to obtain length of each block. Further, the determination engine 206 may divide a width of the logical print media by the number of columns to obtain width of each block.

The determination engine 206 may subsequently identify, the matrix block corresponding to the desired print area in the second print matrix, using the row number and column number indicated in the print area input. Thus, in the previous example of user selecting the matrix block 404-n, the determination engine 206 may identify the matrix block 412-n as corresponding to the user defined print area. The determination engine 206 may define the user space coordinates indicating the top margin coordinates as the starting point and the length and the width of the matrix block in the second print matrix as the dimensions of the of the matrix block 412. The determination engine 206 may further save the user space coordinates in the print area data 326.

Further, the print engine 208 may convert the user space coordinates to device space coordinates indicating the starting point and dimensions for the user defined print area in a printer control language. The print engine 208 may then print the print data in the user defined print area of the print media. In one example, the print engine 208 may use the device space coordinates to have the print data printed by a printhead of the print device on the user defined print area of the print media.

Figure 5:
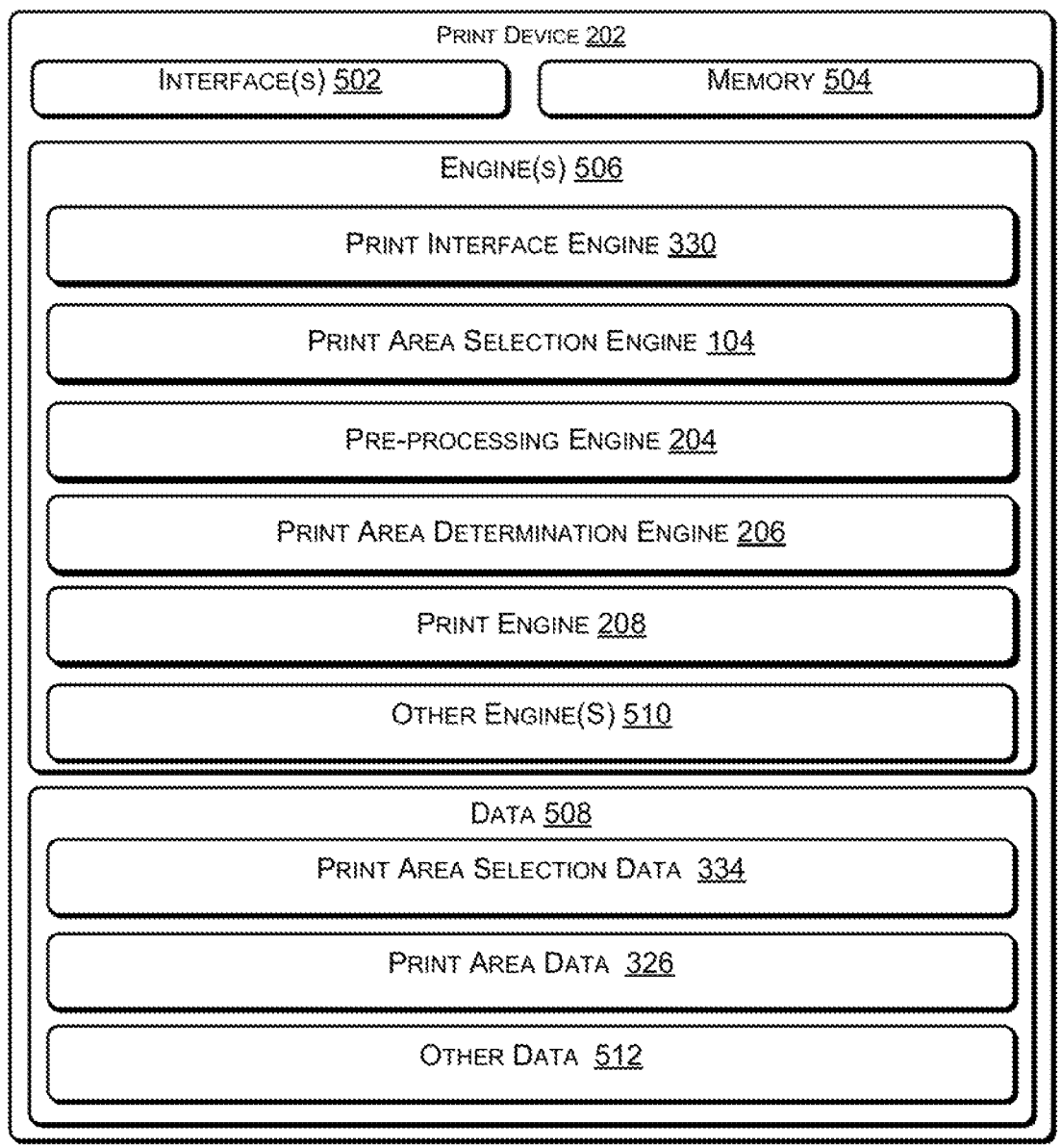
FIG. 5 illustrates a print device, according to another example implementation of the present subject matter.

FIG. 5 illustrates the print device 202 according to another example implementation of the present subject matter. As previously described, the engines of the print unit 302 and the manager 102 may be implemented on the print device 202 used by the user for printing digital documents. The print device includes interface(s) 502, memory 504, engine(s) 506, and data 508. The engines(s) 506 include the print interface engine 330, the selection engine 104, the pre-processing engine 204, the determination engine 206, the print engine 208, and other engine(s) 510. The data 508 include print area data 318, print area selection data 334, and other data 512.

As previously described, the print interface engine 330 may initially provide the print interface to the user for receiving print instructions for printing the print data. To have the print data printed, the user may access the print interface provided and provide instructions for printing the print data. On receiving the print instructions, print interface engine 330 may forward the instructions to the selection engine 104. The selection engine 104 may provide the user, access to the print area selection interface for defining the print area and request the user to define the first print matrix for creating the logical partition of the print media. The user may then define the first print matrix.

In one example, the selection engine 104 may receive a matrix input indicating the total number of rows and columns for defining the first print matrix for logical partition of the print media. The selection engine 104 in turn may define the first print matrix having a user defined number of columns and rows, dividing the first print matrix in the plurality of user defined blocks. The selection engine 104 may further receive an indication of the row number and the column number of the first print matrix for defining the matrix block corresponding to the user defined print area of the print media. The selection engine 104 may subsequently obtain the print area input indicating a total number of rows and columns used by the user for defining the first print matrix for logical partition of the print media. The print area input may further indicate a row number and a column number of the matrix block, corresponding to the user defined print area, from the first print matrix. The selection engine 104 may save the print area input in the print area selection data 334. The selection engine 104 may further provide a print command having the print area input to the pre-processing engine 204.

On receiving the print command having the print area input, the pre-processing engine 204 may allocate resources required for completing a print job of printing the print data. Subsequently the determination engine 206 may determine user space coordinates corresponding to the user defined print area, based on the print area input and dimensions of the print media. To determine the user space coordinates, the determination engine 206 may initially obtain the dimensions of the print media. The determination engine 206 may further define the second print matrix using the dimensions of the print media and the total number of rows and columns such that the second print matrix has a plurality of blocks equal to the user defined plurality of blocks of the first print matrix. The determination engine 206 may then designate top margin coordinates to starting point of each of the plurality of blocks and determine length and width of each of the plurality of blocks based on the dimensions of the print media and the total number of rows and columns of the second print matrix. The determination engine 206 may then identify the matrix block corresponding to the desired print area, in the second print matrix using the row number and column number indicated in the print area input.

The determination engine 206 may subsequently define user space coordinates indicating the top margin coordinates as a starting point of the user defined print area and the length and the width of the matrix block as the dimensions of the user defined print area on the print media. Further, the print engine 208 may convert the user space coordinates to device space coordinates indicating the starting point and dimensions for the user defined print area in a printer control language. The print data may subsequently be printed in the user defined print area of the print media.

Figure 6:
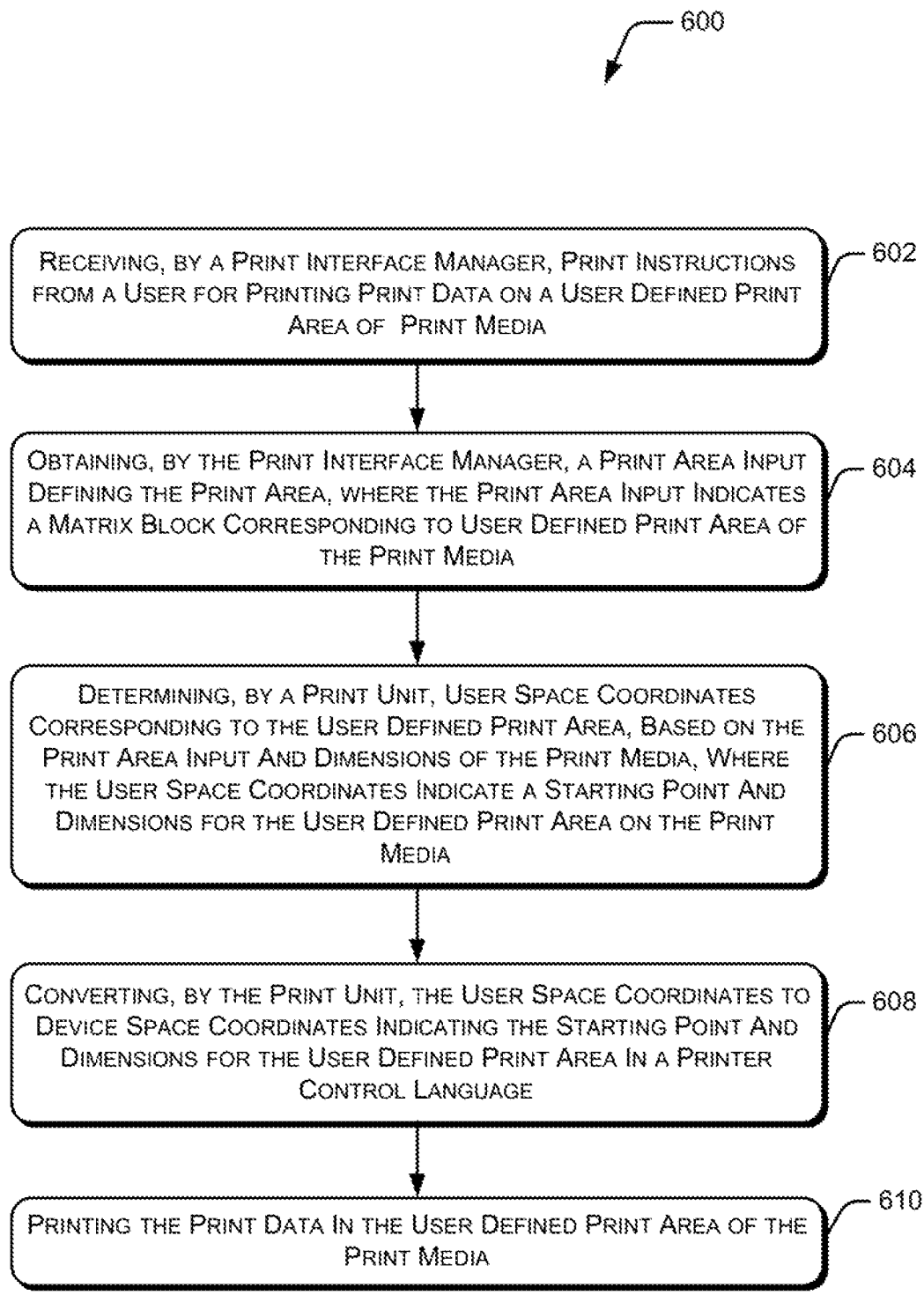
FIG. 6 illustrates a method for printing of print data in a user defined area of a print media, according to an example implementation of the present subject matter.
Figure 7:
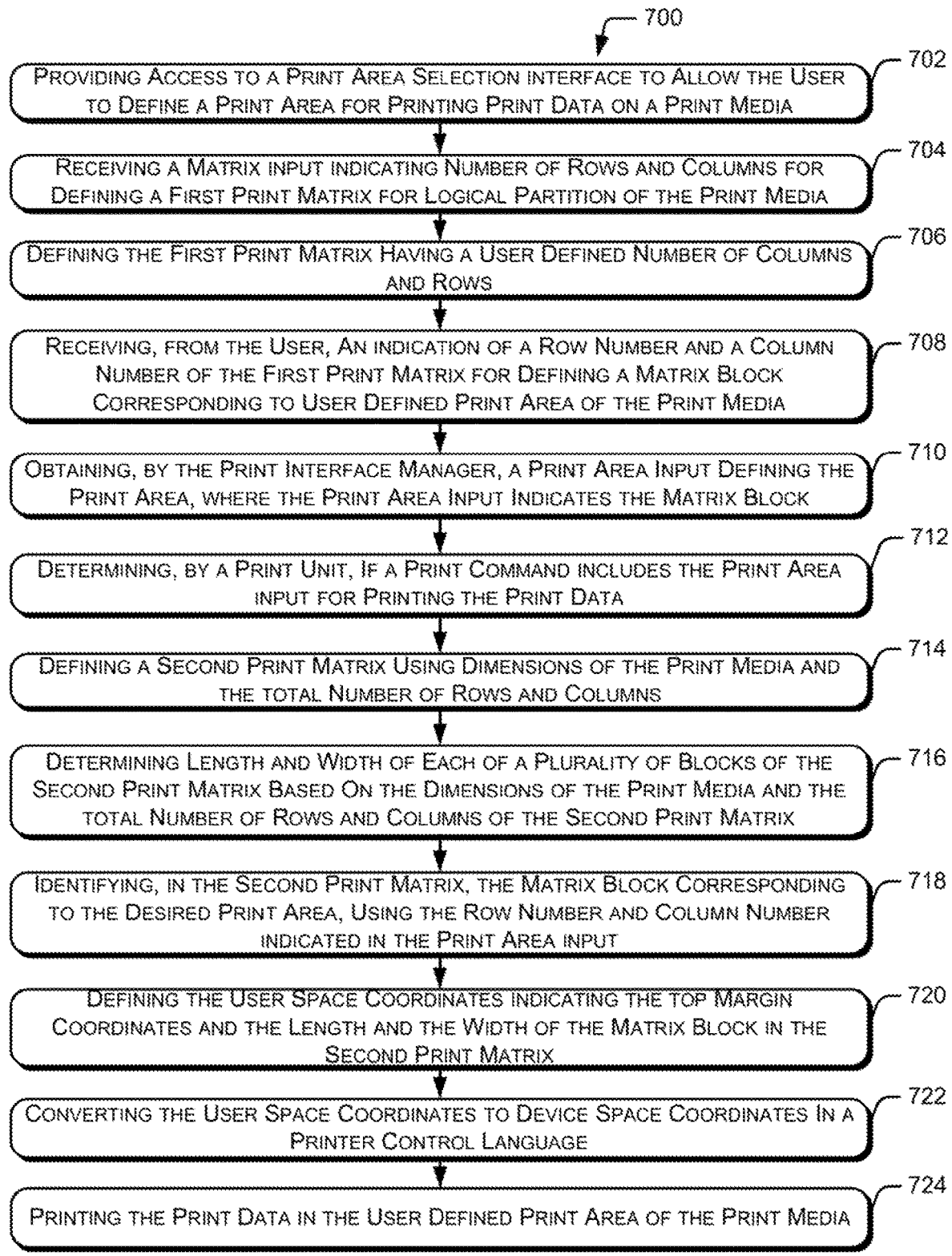
FIG. 7 illustrates a method for printing of print data in a user defined area of a print media, according to another example implementation of the present subject matter.

FIG. 6-7 illustrate example methods 600 and 700, respectively, for printing of print data in a user defined area of a print media. The order in which the methods are described is not intended to be construed as a limitation, and any number of the described method blocks may be combined in any order to implement the methods, or an alternative method. Furthermore, methods 600 and 700 may be implemented by processing resource or computing device(s) through any suitable hardware, non-transitory machine readable instructions, or combination thereof.

It may also be understood that methods 600 and 700 may be performed by programmed computing devices, such as user devices 304 and print device 202 implementing manager 102 and print unit 302, as depicted in FIGS. 1-5. Furthermore, the methods 600 and 700 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 600 and 700 are described below with reference to manager 102 and print unit 302 as described above; other suitable systems for the execution of these methods may also be utilized. Additionally, implementation of these methods is not limited to such examples.

At block 602, print instructions are received from a user for printing the print data on the user defined print area of the print media. In one example, the print instructions are received, by a print interface manager, for instance, the manager 102.

At block 604, a print area input defining the print area is obtained by the print interface manager. In one example, the print area input indicates a matrix block corresponding to user defined print area of the print media. To obtain the print area input, the print interface manager may define a first print matrix based on matrix input received from the user. The print interface manager may subsequently obtain from the user, an indication of a row number and a column number of the first print matrix for defining the matrix block corresponding to the user defined print area of the print media.

At block 606, user space coordinates corresponding to the user defined print area are determined by a print unit. In one example, the user space coordinates may be determined based on the print area input and dimensions of the print media. Further, the user space coordinates indicate a starting point and dimensions for the user defined print area on the print media. To obtain the user space coordinates, the print unit may initially define a second print matrix having same number of plurality block as the user defined plurality of blocks of the first print matrix. The print unit may then identify the matrix block on the second print matrix. The print unit may further, determine the length and width of the matrix block to obtain the user space coordinates.

At block 608, the user space coordinates are converted to device space coordinates by the print unit. In one example, the device space coordinates indicate the starting point and dimensions for the user defined print area in a printer control language.

At block 610, the print data is printed in the user defined print area of the print media using the device space coordinates.

FIG. 7 illustrates another method 700 for printing of print data in a user defined area of a print media, according to another example implementation of the present subject matter.

At block 702, user is provided access to a print area selection interface to allow the user to define the print area. In one example, the print interface manager provides the print area selection interface upon receiving print instructions for printing print data on a user defined print area of a print media. The print interface manager may further request the user to define a first print matrix for creating a logical partition of the print media.

At block 704, a matrix input is received. In one example, the matrix input indicates number of rows and columns for defining the first print matrix for logical partition of the print media. The user may provide the matrix input on the print area selection interface and may define the number of rows and columns based on the number of blocks into which the user desires to divide the print media.

At block 706, the first print matrix having a user defined number of columns and rows is defined. In one example, the print interface manager defines the first print matrix based on the matrix input indicating the number of rows and columns desired in the first print matrix. The first print matrix may thus have a plurality of user defined blocks based on the user defined number of columns and rows.

At block 708, an indication of a row number and a column number of the first print matrix for defining a matrix block is received from the user. In one example, the user indicated row number and column number identify the matrix block corresponding to the user defined print area of the print media.

At block 710, a print area input defining the print area is obtained by the print interface manager. In one example, the print area input indicates the matrix block corresponding to user defined print area of the print media.

At block 712, it is determined if a print command received by a print unit includes the print area input for printing the print data. In one example, upon obtaining the print area input, the print interface manager may send the print command to the print unit for printing the print data. On receiving the print command, the print unit may determine whether the print unit includes the print area input to ascertain if a normal print process has to be followed or whether the print area has to be customized. In one example, the print area input indicates the row number and the column number of the matrix block corresponding to user defined print area and a total number of rows and columns used for defining the first print matrix for logical partition of the print media. The print unit may further allocate resources required for completing a print job of printing the print data.

At block 714, a second print matrix is defined using the dimensions of the print media and the total number of rows and columns. Upon determining that the print command includes the print area input, the print unit may obtain dimensions of the print media to be used for printing. In one example, the dimensions of the print media may be logical dimensions, determined based on actual dimensions of the print media and non-printable margins of the print media. The print unit may subsequently define the second print matrix within the logical dimensions of the print media. The second print matrix has the total number of rows and columns equal to the first print matrix. Further, the second print matrix has a plurality of blocks equal to the user defined plurality of blocks of the first print matrix.

At block 716, length and width of each of the plurality of blocks is determined. In one example, dimensions, i.e., the length and width is calculated: based on the dimensions of the print media and the total number of rows and columns of the second print matrix. In one example, length of the logical print media may be divided by the number of rows to obtain length of each block. Further, width of the logical print media may be divided by the number of columns to obtain width of each block.

At block 718, the matrix block corresponding to the desired print area is identified in the second print matrix. In one example, the print unit may use the row number and column number indicated in the print area input to identify the matrix block in the second print matrix.

At block 720, user space coordinates indicating the top margin coordinates and the length and the width of the matrix block in the second print matrix are defined. The print unit may initially designate the starting point of each of the plurality of blocks are as top margin coordinates.

At block 722, the user space coordinates are converted to device space coordinates by the print unit. In one example, the device space coordinates indicate the starting point and dimensions for the user defined print area in a printer control language.

At block 724, the print data is printed in the user defined print area of the print media using the device space coordinates.

Although examples for the present subject matter have been described in language specific to structural features and/or methods, it should be understood that the appended claims are not limited to the specific features or methods described. Rather, the specific features and methods are disclosed and explained as examples of the present subject matter.

We claim:

1. A print interface system comprising:
a print area selection engine coupled to the system processor to:
receive a user instruction for printing print data on a user defined print area of a print media;
obtain a print area input defining the print area, wherein the print area input indicates a matrix block of a plurality of blocks of a print matrix into which the print media has been logically partitioned, the matrix block indicating where on the print media the print data is to be printed; and
provide the print area input to a print unit to print the print data on the print media in the matrix block of the print matrix into which the print media has been logically partitioned.

2. The print interface system as claimed in claim 1, wherein the print area selection engine further is to:
provide to the user, access to a print area selection interface to allow the user to define the print area; and
request the user to define the print matrix of the print media.

3. The print interface system as claimed in claim 2, wherein the print area selection engine further is to:
receive a matrix input indicating a number of rows and columns for defining the print matrix of the print media;
define the print matrix having a user defined number of columns and rows by logically partitioning the print media into the blocks as organized in a grid having the user defined number of columns and rows; and
receive, from the user, an indication of a row number and a column number of the matrix block within the print matrix where the print data is to be printed on the print media.

4. The print interface system as claimed in claim 2, wherein the print data is part of a digital document.

5. A method for printing print data in a user defined print area of a print media, the method comprises:
receiving, by a print interface system, print instructions from a user for printing the print data on the user defined print area of the print media;
obtaining, by the print interface system, a print area input defining the print area, wherein the print area input indicates a matrix block of a plurality of blocks of a print matrix into which the print media has been logically partitioned, the matrix block indicating where on the print media the print data is to be printed;
determining, by a print unit, user space coordinates corresponding to the user defined print area, based on the print area input and dimensions of the print media, wherein the user space coordinates indicate a starting point and dimensions for the user defined print area on the print media;
converting, by the print unit, the user space coordinates to device space coordinates indicating the starting point and dimensions for the user defined print area in a printer control language; and
printing the print data on the print media in the matrix block of the print matrix into which the print media has been logically partitioned, using the device space coordinates.

6. The method as claimed in claim 5, wherein obtaining the print area input comprises:
providing to the user, access to a print area selection interface to allow the user to define the print area; and
requesting the user to define a first the print matrix.

7. The method as claimed in claim 6, wherein obtaining the print area input further comprises:
receiving a matrix input indicating a number of rows and columns for defining the first print matrix of the print media;
defining the print matrix having a user defined number of columns and rows by logically partitioning the print media into the blocks as organized in a grid having the user defined number of columns and rows; and
receiving, from the user, an indication of a row number and a column number of the matrix block within the print matrix where the print data is to be printed on the print media.

8. The method as claimed in claim 7, further comprising:
receiving, by the print unit, a print command for printing the print data;
allocating resources required for completing a print job of printing the print data; and
determining if the print command includes the print area input for printing the print data, wherein the print area input indicates the row number and the column number of the matrix block corresponding to the user defined print area and the number of rows and columns used for defining the print matrix.

9. The method as claimed in claim 8, wherein the print matrix is a first print matrix, and determining the user space coordinates comprises:
obtaining dimensions of the print media;
defining a second print matrix using the dimensions of the print media and having a number of rows and columns equal to the number of rows and columns of the first print matrix, wherein the second print matrix has a plurality of blocks equal in number to the blocks of the first print matrix;
designating top margin coordinates to a starting point of each of the plurality of blocks of the second print matrix;
determining a length and a width of each of the plurality of blocks of the second print matrix based on the dimensions of the print media and the number of rows and columns of the second print matrix;
identifying, in the second print matrix, the matrix block corresponding to the desired print area, using the row number and column number indicated in the print area input; and
defining the user space coordinates indicating the top margin coordinates and the length and the width of the matrix block in the second print matrix.

10. The method as claimed in claim 9, wherein the dimensions of the print media are logical dimensions, determined based on actual dimensions of the print media and non-printable margins of the print media.

11. A print device having a print unit comprising:
a pre-processing engine to:
determine if a print command includes user indication for printing print data on a user defined print area of a print media, the print command including a print area input indicating a matrix block of a plurality of blocks of a print matrix into which the print media has been logically partitioned, the matrix block indicating where on the print media the print data is to be printed;
a print area determination engine to:
determine user space coordinates corresponding to the user defined print area, based on the print area input and dimensions of the print media, wherein the user space coordinates indicate a starting point and dimensions for the user defined print area on the print media; and
a print engine to:
print the print data on the print media in the matrix block of the print matrix into which the print media has been logically partitioned, using the user space coordinates.

12. The print device as claimed in claim 11, wherein the print engine further is to convert the user space coordinates to device space coordinates indicating the starting point and dimensions for the user defined print area in a printer control language for printing the print data.

13. The print device as claimed in claim 11, wherein the pre-processing engine further is to:
receive the print command having the print area input, wherein the print area input indicates a total number of rows and columns used by a user for defining the print matrix of the print media, the print area input further indicating a row number and a column number of the matrix block within the print matrix where the print data is to be printed on the print media; and
allocate resources required for completing a print job of printing the print data.

14. The print device as claimed in claim 13, wherein the print matrix is a first print matrix, and the print area determination engine further is to:
obtain dimensions of the print media;
define a second print matrix using the dimensions of the print media and having a number of rows and columns equal to the number of rows and columns of the first print matrix, wherein the second print matrix has a plurality of blocks equal in number to the blocks of the first print matrix;
designate top margin coordinates to starting point of each of the plurality of blocks of the second print matrix;
determine a length and a width of each of the plurality of blocks of the second print matrix based on the dimensions of the print media and the number of rows and columns of the second print matrix;
identify, in the second print matrix, the matrix block corresponding to the desired print area, using the row number and column number indicated in the print area input; and
define the user space coordinates indicating the top margin coordinates as the starting point and the length and the width of the matrix block in the second print matrix as the dimensions.

15. The print device as claimed in claim 11, further comprising:
a print interface engine to:
provide a printer interface to a user for receiving print instructions for printing the print data;
receive the print instructions for printing the print data;
provide to the user, access to a print area selection interface to allow the user to define the print area; and
request the user to define the print matrix of the print media; and
a print area selection engine to:
receive a matrix input indicating a total number of rows and columns for defining the print matrix of the print media;

define the print matrix having a user defined number of columns and rows by logically partitioning the print media into the blocks as organized in a grid having the user defined number of columns and rows; and
receive, from the user, an indication of a row number and a column number of the matrix block within the print matrix where the print data is to be printed on the print media.

\* \* \* \* \*